April 15, 1952     H. R. COON, SR., ET AL     2,592,793
WRAPPING MACHINE FOR BUTTER AND THE LIKE

Filed May 14, 1945     14 Sheets-Sheet 1

Inventors.
Harold R. Coon Sr,
Earl J. Rapp,
BY Bair & Freeman
Atty's.

April 15, 1952   H. R. COON, SR., ET AL   2,592,793
WRAPPING MACHINE FOR BUTTER AND THE LIKE
Filed May 14, 1945   14 Sheets-Sheet 9

INVENTORS.
Harold R. Coon, Sr. + Earl J. Rapp,
BY
Bair + Freeman
Atty's.

Inventors.
Harold R. Coon, Sr.,
Earl J. Rapp,
BY Bair & Freeman
Atty's.

Patented Apr. 15, 1952

2,592,793

UNITED STATES PATENT OFFICE 2,592,793

WRAPPING MACHINE FOR BUTTER AND THE LIKE

Harold R. Coon, Sr., and Earl J. Rapp, Toledo, Ohio, assignors to Lynch Package Machinery Corporation, Toledo, Ohio, a corporation of Ohio Application May 14, 1945, Serial No. 593,708

1 Claim. (Cl. 53—131)

Our present invention relates to a wrapping machine for butter, oleomargarine, lard and similar products, the machine being entirely automatic in operation.

An important object is to provide print wrapping mechanism having flap folding devices operable in timed sequence and in a manner to efficiently wrap the print of butter and discharge it onto the conveyors which convey the prints of butter to a cartoning mechanism.

With these and other objects in view, our invention consists in the construction, arrangement and combination of the various parts of our device whereby the objects contemplated are attained, as hereinafter more fully set forth, pointed out in the claim and illustrated in the accompanying drawings, wherein:

On the accompanying drawings we have used the reference numeral 10 to indicate a pair of supporting castings for a transmission housing 12. The transmission housing 12 has a portion 14 which extends forwardly to a frame 16. The frame supports a parchment wrapping mechanism which will be described in detail hereinafter. Spaced from the frame 16 is a second frame 18 for supporting a cartoning mechanism (not described herein).

Figures 2, 3:
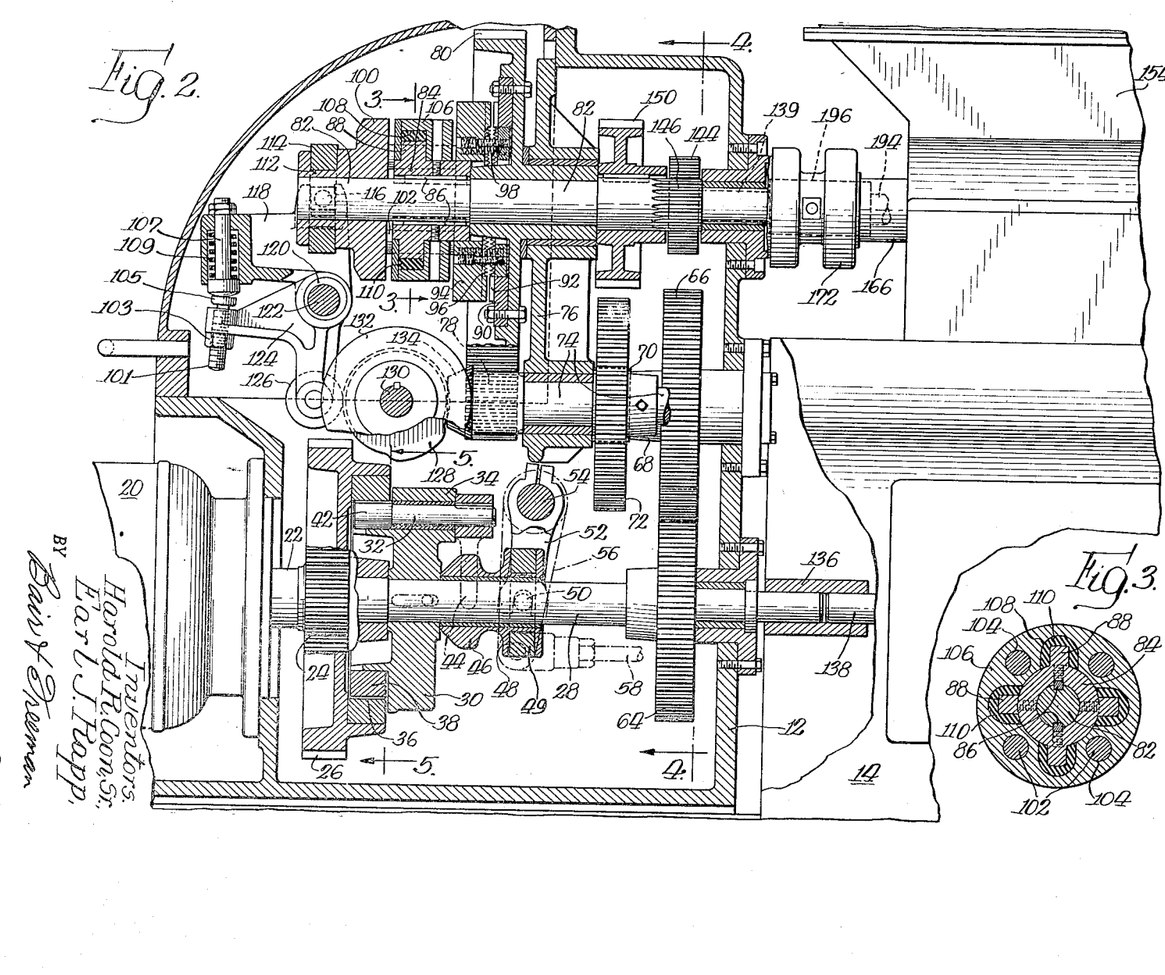
Fig. 2 is an enlarged longitudinal sectional view vertically through the transmission housing of the machine which appears at the left in Fig. 1, the bracket 2 thereadjacent indicating the extent of Fig. 2 in relation to Fig. 1.
Fig. 3 is a vertical sectional view on the line 3—3 of Fig. 2 showing details of a butter printer worm drive clutch.

The transmission housing 12 has attached thereto a motor 20 provided with a shaft 22 terminating in a drive pinion 24 as shown in Fig. 2. The pinion 24 meshes with a gear 26 which freely rotates on a main or drive shaft 28.

Figure 5:
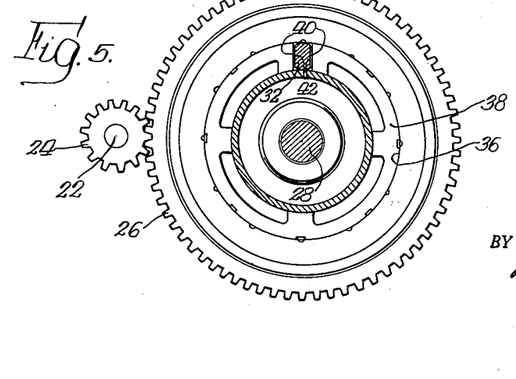
Fig. 5 is a vertical sectional view on the line 5—5 of Fig. 2 showing details of a master clutch for connecting the drive motor with the entire machine.

Keyed to the drive shaft 28 is a clutch disk 30 carrying a rock shaft 32 in a boss 34 thereof. The gear 26 has an annular internal clutch face 36 in which an expansible clutch ring 38 is mounted. The clutch ring 38, as shown in Fig. 5, is split, the faces of the split being shown at 40. The rock shaft 32 has a portion provided with opposite flats 42 which fit between the faces 40.

Figure 4:
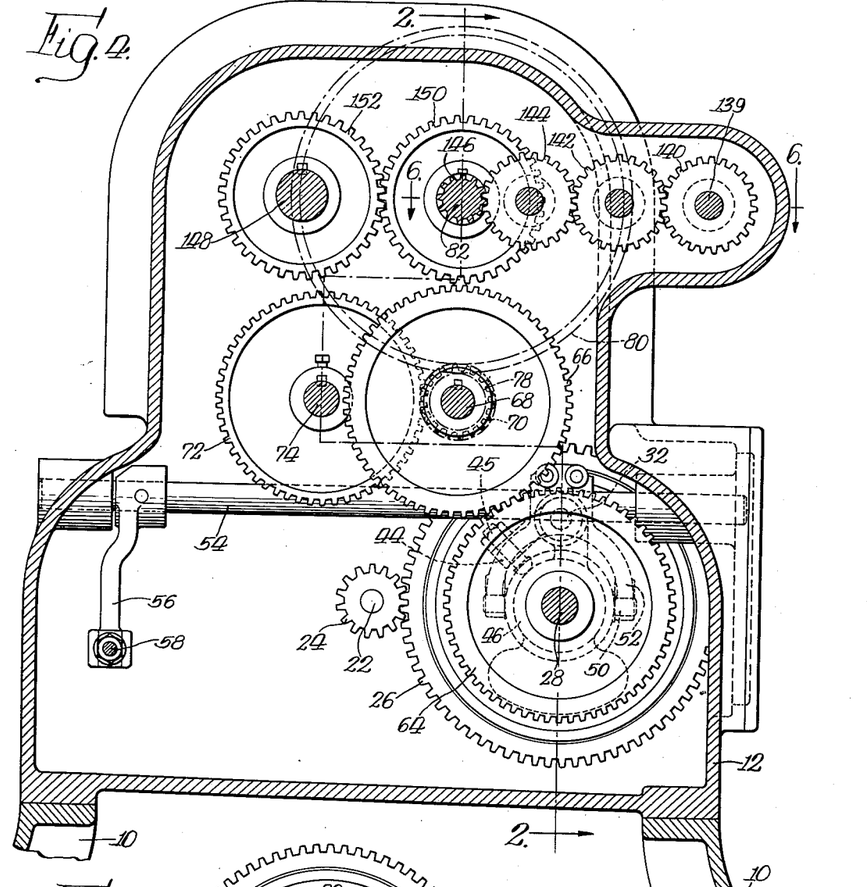
Fig. 4 is a vertical sectional view on the line 4—4 of Fig. 2 showing gear connections between various operating elements of the transmission (Fig. 2 being taken on the line 2—2 of Fig. 4)

An arm 44 is secured to the rock shaft 32 for swinging it from the position of Fig. 5 with the faces 40 vertical to the position of Fig. 2 with the faces at an angle to the vertical. A clutch cone 46 cooperates with the arm 44 for this purpose, the clutch itself being shown disengaged in Fig. 5 and engaged in Fig. 2. As shown in Fig. 4, the arm 44 has a set screw 45 for adjustment purposes.

The clutch cone 46 has an annular groove 48 in which a ring 49 is mounted having opposite studs 50 to cooperate with the forks of a clutch yoke 52. The clutch yoke 52 is carried by a control shaft 54, and this shaft may be rocked by an arm 56, a link 58 (Fig. 2—dot-and-dash lines), and a control lever 59 (see Fig. 1). The control lever 59 is mounted on a rock shaft 60 which has a depending arm 62 inside the housing extension 14 to which the link 58 is pivoted. Thus the lever 59 may be used for manually controlling the complete machine as to the operation thereof by the motor 20.

The drive shaft 28 has thereon a gear 64 which meshes with a gear 66 mounted on a countershaft 68 (see Fig. 2). The countershaft 68 carries a pinion 70 which meshes with a gear 72 on a countershaft 74 (also see Fig. 4). The shaft 68 extends through a partition 76 and has a second pinion 78 thereon. The pinion 78 meshes with a gear 80 which rotates freely on a printer worm drive shaft 82.

The printer worm drive shaft has a clutch element 84 slidably and non-rotatably mounted thereon as by means of a pair of keys 86 (see Figs. 2 and 3), the clutch element 84 being provided with four radial extensions 88. On the rear face of the gear 80 we provide a clutch disk 90 having radial serrations 92. A companion clutch disk 94 is provided having radial serrations 96. The disk 94 is normally held spaced from the disk 90 by a plurality of springs 98.

Slidably and rotatably mounted on the shaft 82 is a clutch engaging disk 100 connected with the disk 94 by means of four rods 102. The rods 102 pass slidably through openings 104 of a disklike clutch element 106 which surrounds the clutch element 84 and has a plurality of sockets 108, one for each of the projections 88. The sockets are somewhat larger than the projections, and blocks 110 of rubber or similar material are interposed between the two for cushioning the action of the clutch.

The clutch disk 100 has an annular groove 112 in which a ring 114 is mounted, the ring having opposite studs 116 coacting with the forks of a clutch yoke 118 pivoted on an eccentric 120. The eccentric 120 is part of an adjusting shaft 122 which may be rotated and locked at two positions for the purpose of adjusting the clutch yoke 118 so that the clutch plates 100 and 106 may or may not engage for a purpose which will be hereinafter explained. The two positions are determined by a retractible pin 123 (see Fig. 1) to coact selectively with two openings 125.

For effecting such throw of the clutch yoke we provide a bell crank 124 also pivoted on the eccentric 120 and carrying a roller 126. The roller 126 coacts with a cam 128 on a cam shaft 130. The cam shaft has thereon a bevel gear 132 which meshes with a bevel pinion 134. The bevel pinion 134 is mounted on the countershaft 74 and is thereby driven by the pinion 70 and the gear 72 from the shaft 68. Thus the cam 128 rotates in timed sequence with the other operating mechanisms of the machine which are driven by a coupling 136 between shaft 28 and a shaft 138 (see Fig. 2), as will hereinafter appear.

An operating connection is provided between the bell crank 124 and the clutch yoke 118 by means of an adjustable screw 101 threaded into the bell crank and having a lock nut 103 threaded thereon. The screw 101 has a head 105 adapted to contact with the head of a bolt 107 slidable in the yoke 118. A spring 109 is interposed between the head of the bolt 107 and the yoke to permit a certain amount of relative movement between 107 and 118 without damaging the clutch serrations 92 and 96, as will hereinafter appear.

Other portions of the machine are driven by certain gearing shown in Fig. 4, which will now be described.

A countershaft 139 is driven through a train of gears 140, 142 and 144 from a pinion 146, the pinion being in the form of teeth cut into the printer worm shaft 82. A second printer worm shaft 148 is provided and it is driven from the shaft 82 through gears 150 and 152. The mechanism driven by the countershaft 139 will be described later.

Figure 1:
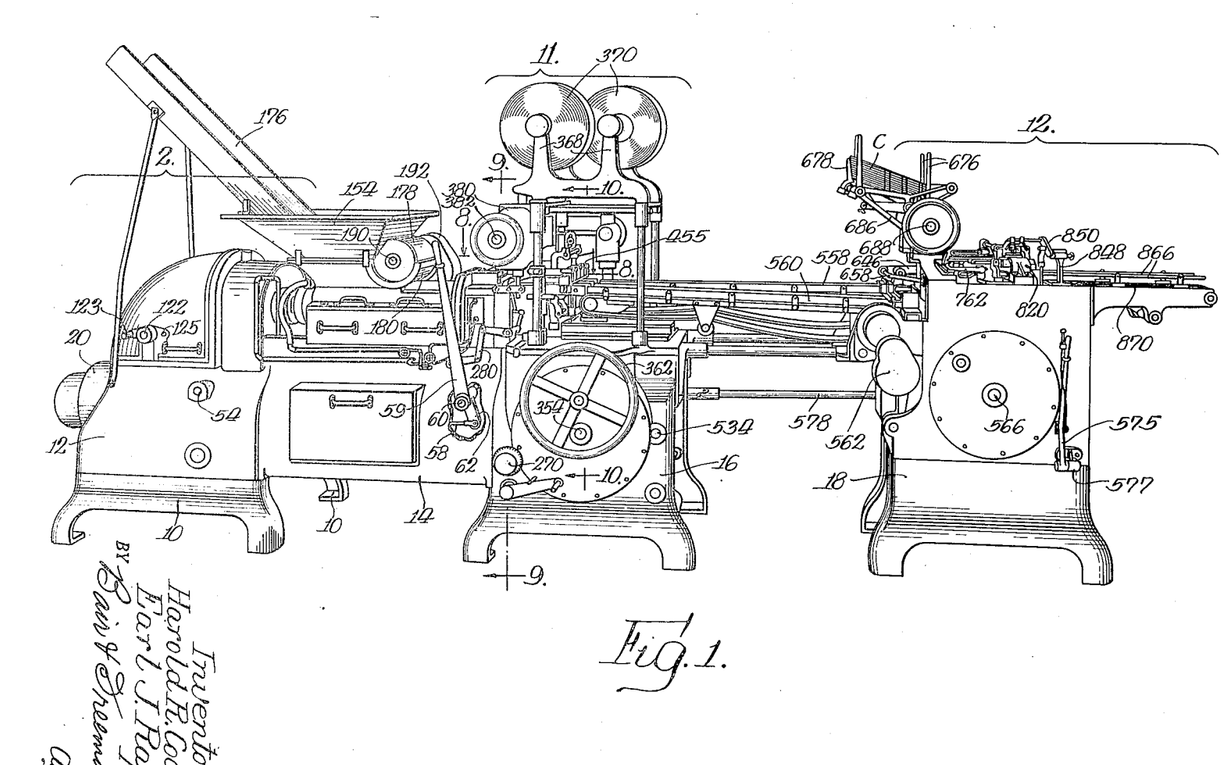
Fig. 1 is a perspective view of a printing, wrapping and cartoning machine for butter and the like embodying our invention and showing the general relation of the parts of the machine, this view being of the side of the machine considered as the right-hand side when facing the direction of travel of the butter therethrough.
Figure 6:
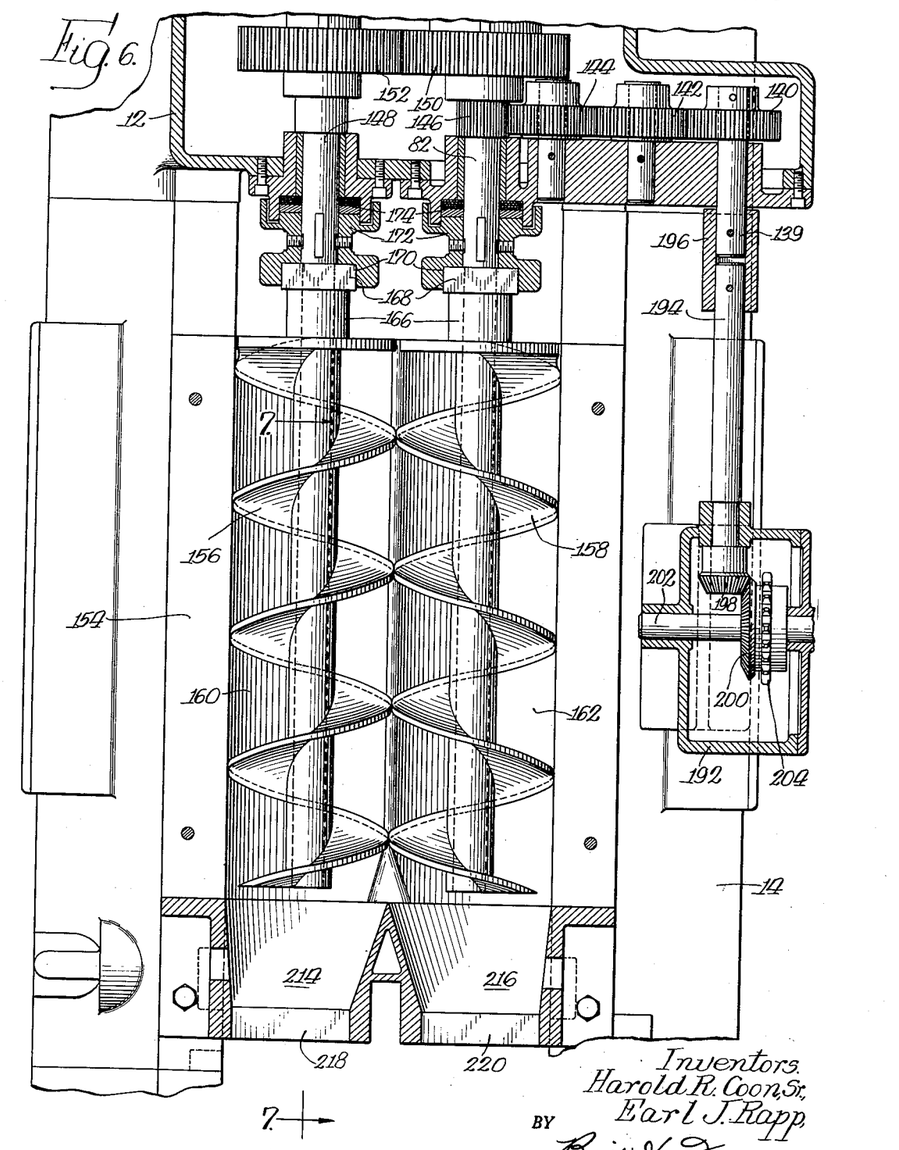
Fig. 6 is a horizontal sectional view on the line 6—6 of Fig. 4 showing the printer worms for feeding the butter from a hopper into print forming cavities.
Figure 7:
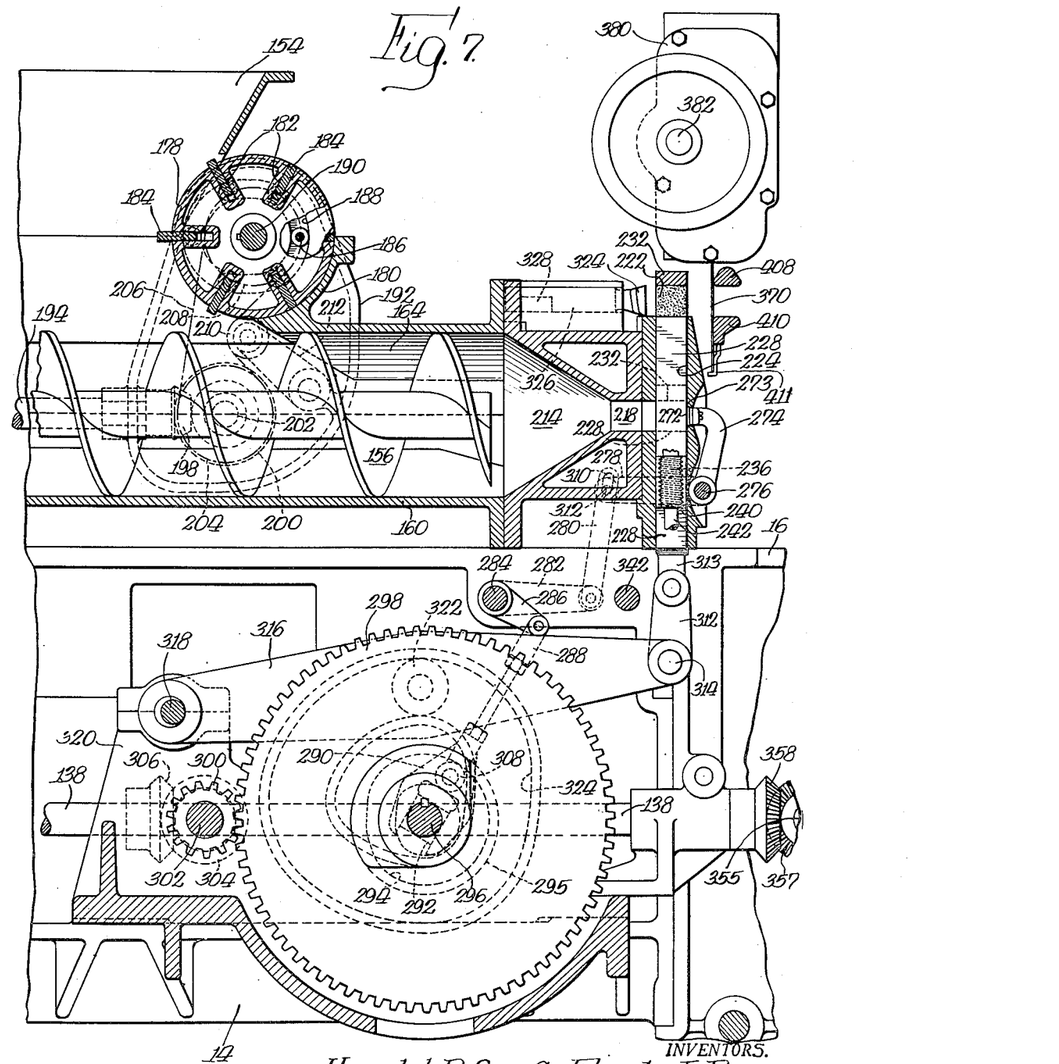
Fig. 7 is a vertical sectional view on the line 7—7 of Fig. 6 showing a hopper feed roll, the print forming mechanism and an air relief valve associated therewith.

A butter hopper 154 is provided (see Figs. 1 and 7). Within the hopper a pair of printer worms or feed screws 156 and 158 are rotatably mounted. The worms 156 and 158 rotate in semicylindrical seats 160 and 162 of the hopper 154 with their forward ends rotating in tubular portions 164 of the hopper, as shown in Fig. 7. The rear ends of the worms are suitably journaled in bearings 166, and the shafts for the worms terminate in square heads 168 (see Fig. 6). The heads 168 are received in square sockets 170 of coupling members 172, which coupling members are secured as by keying to the worm drive shafts 82 and 148. Suitable packings 174 are provided to prevent escape of transmission grease from the transmission housing 12 into the hopper 154. As shown in Fig. 1, the hopper may be provided with a feed chute 176 into which the butter or other material to be wrapped and cartoned may be dumped from the butter tubs or the like.

A hopper feed mechanism is provided in the form of a drum 178 rotatable in a semi-cylindrical seat 180 (see Fig. 7). The drum 178 has radial slots 182 in each of which a feeder blade 184 is mounted for radial sliding movement. Opposite ends of the blades are provided with rollers 186 which travel in cam grooves 188. The grooves are formed in stationary cams 189 at each end of the seat 180 and are so shaped that the blades are retracted during the right-hand half of the revolution (in Fig. 7) and extended during the left-hand half of the revolution. The blades 184 thereby impinge the butter in the hopper 154 and feed it downwardly toward the printer worms 156 and 158.

The feeder drum 178 is mounted on a shaft 190 and the shaft is driven by suitable gearing mechanism in a housing 192 (see Figs. 6 and 7) into which housing an extension 194 of the countershaft 139 projects. The shafts 139 and 194 are connected together by a coupling 196.

The gearing within the housing 192 comprises a bevel gear 198 meshing with a bevel gear 200 on a shaft 202. The bevel gear 200 has a sprocket 204 connected by a chain 206 (see Fig. 7) with a sprocket 208 on the shaft 190. An idler sprocket 210 is mounted on an adjustable arm 212 to take up slack in the chain.

The printer worms 156 and 158 terminate just short of right and left-hand constricting nozzles 214 and 216 having outlet portions 218 and 220 which are of a size to form the length and height of a quarter pound print of butter or the like. The print is shown in end view at 222 in Fig. 7. The butter is forced by the worms 156 and 158 into the outlet portions 218 and 220, which may be termed "molds," to thereby produce continuous slabs of butter of indefinite length. From the molds 218 and 220, however, the butter enters right and left-hand vertical molds 224 and 226 (see Figs. 7 and 8), and are sheared off and elevated through these latter molds by rams 228 and 230. The rams 228 and 230 mold the prints to width, and, at the same time, maintain their height by reason of top walls 232 and 234 which are best shown in Fig. 9. In Fig. 7 the rams 228 and 230 and their top walls 232 and 234 are shown in the elevated position, whereas in their lowest position they would register with the bottoms and tops of the molds 218 and 220 as shown by dotted lines.

The top walls 232 and 234 are adjustable with relation to the tops of the rams 222 and 224 by means of left and right-hand screw threads 236 and 238 in a lug 240 of the ram 228, and a downward extension 233 of the top wall member 232 respectively, as shown in section at the left side of Fig. 9. The right-hand side is similarly constructed, and, accordingly, has similar reference numerals.

The two sets of left and right-hand screws 236 and 238 are formed on adjusting shafts 242 and 244, the shaft 242 having a coupling connection 246 with a shaft 248, and the shaft 244 having a coupling connection 250 with a shaft 252.

The shaft 248 extends downwardly through bearings 254 and has a worm gear 256 mounted thereon. The shaft 252 is geared by a pair of pinions 258 to an offset shaft 260 in order to miss the main drive shaft 139. The shaft 260 has a worm gear 262 thereon. Worms 264 and 266 mesh with the worm gears 256 and 262 and are mounted on an adjusting shaft 268. The shaft 268 extends to the exterior of the frame 16 and has a graduated control knob 270 thereon for the purpose of rotating the shaft 268 and thereby the threaded shafts 242 and 244, adjusting the size of each of the two butter prints 222 simultaneously.

Associated with the molds 218, 220, 224 and 226 are air relief valves 272 (see Fig. 7). These air relief valves have beveled edges adapted to seat on valve seats 273. The purpose of the valves is fully disclosed in the Heft, Rapp and Dority Patent No. 2,258,288, issued October 7, 1941, and, accordingly, will not be explained in this application further than to show their relationship to, and operation in, the complete machine.

There is an air relief valve 272 for each of the molds 224 and 226. These valves are similar, and, accordingly, only one will be described. The valve 272 is secured to a rock arm 274 which, in turn, is secured to a shaft 276. The shaft 276 has an arm 278 extending therefrom with which a link 280 is connected by a pin and slot connection. The link 280 is pivotally connected with an arm 282 on a rock shaft 284 having a second arm 286. The second arm 286 has pivoted thereto the upper end of a link 288. The link 288 terminates at its lower end in a fork 290 guided on a guide block 292 through which a cam shaft 296 extends.

A gear 298 on the cam shaft 296 meshes with a pinion 300. The pinion 300 is mounted on a cross shaft 302 which is driven through bevel gears 304 and 306 from the shaft 138. The fork 290 carries a roller 308 which travels in the groove 294 of a cam disk 295. The link 280 has a slot 310 cooperating with a pivot pin 312 of the arm 278 to provide for a limited amount of lost motion, the purpose of which will be explained later.

For operating the vertical rams 228 and 230 we provide links 312 pivoted to lugs 313 on the lower ends of each of the rams 228 and 230 (see Figs. 7 and 9). The links in turn are pivoted to a short shaft 314. The shaft 314 is supported by one end of a lever 316 which has its other end pivoted on an eccentric shaft 318 supported by a pair of brackets 320. The arm 316 carries a roller 322 adapted to travel in a cam groove 324 formed in the gear 298 mounted on the shaft 296. The shaft 318 is eccentric for adjusting the pivot by rotating the shaft and then locking it.

Figure 8:
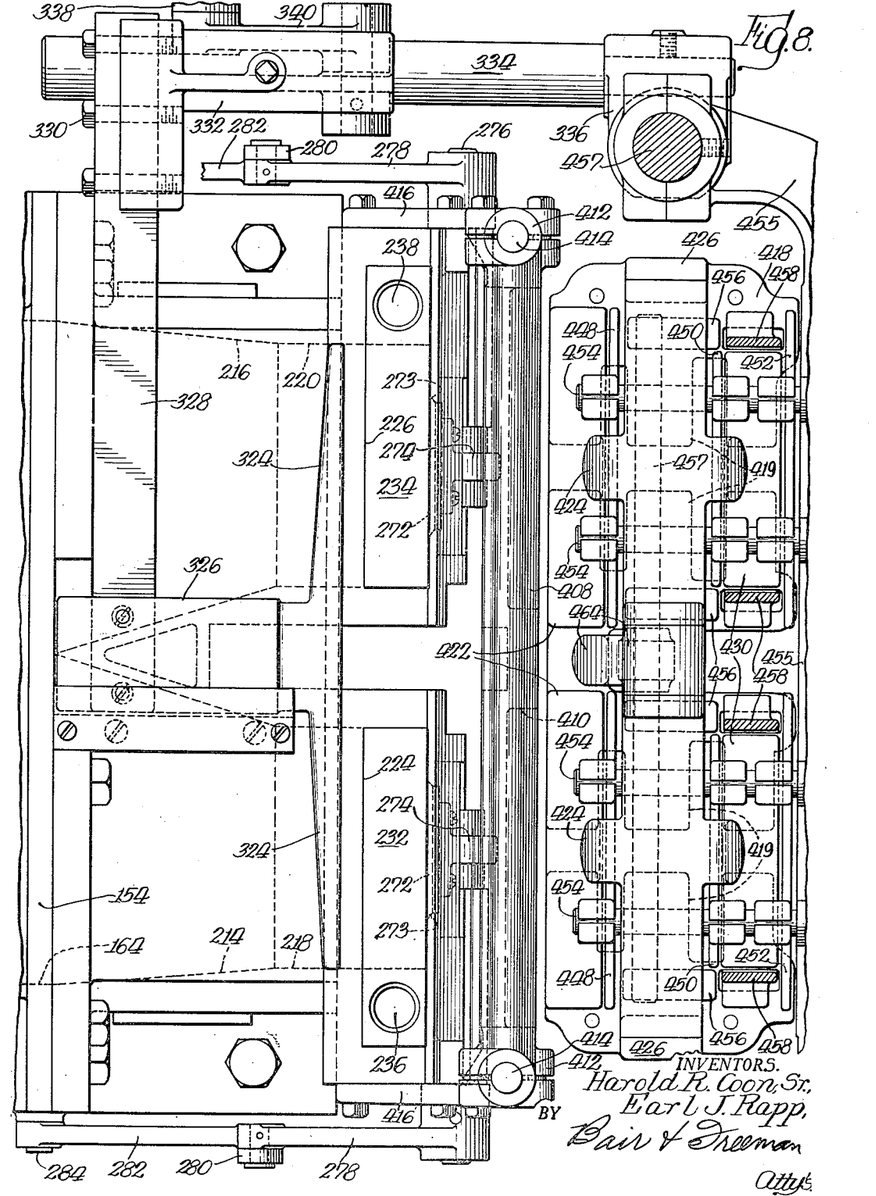
Fig. 8 is an enlarged horizontal sectional view on the line 8—8 of Fig. 1 and shows a plan view of the right-hand half of Fig. 7 together with adjacent portions of the machine, Fig. 8 being drawn at twice the scale of Fig. 7.
Figure 9:
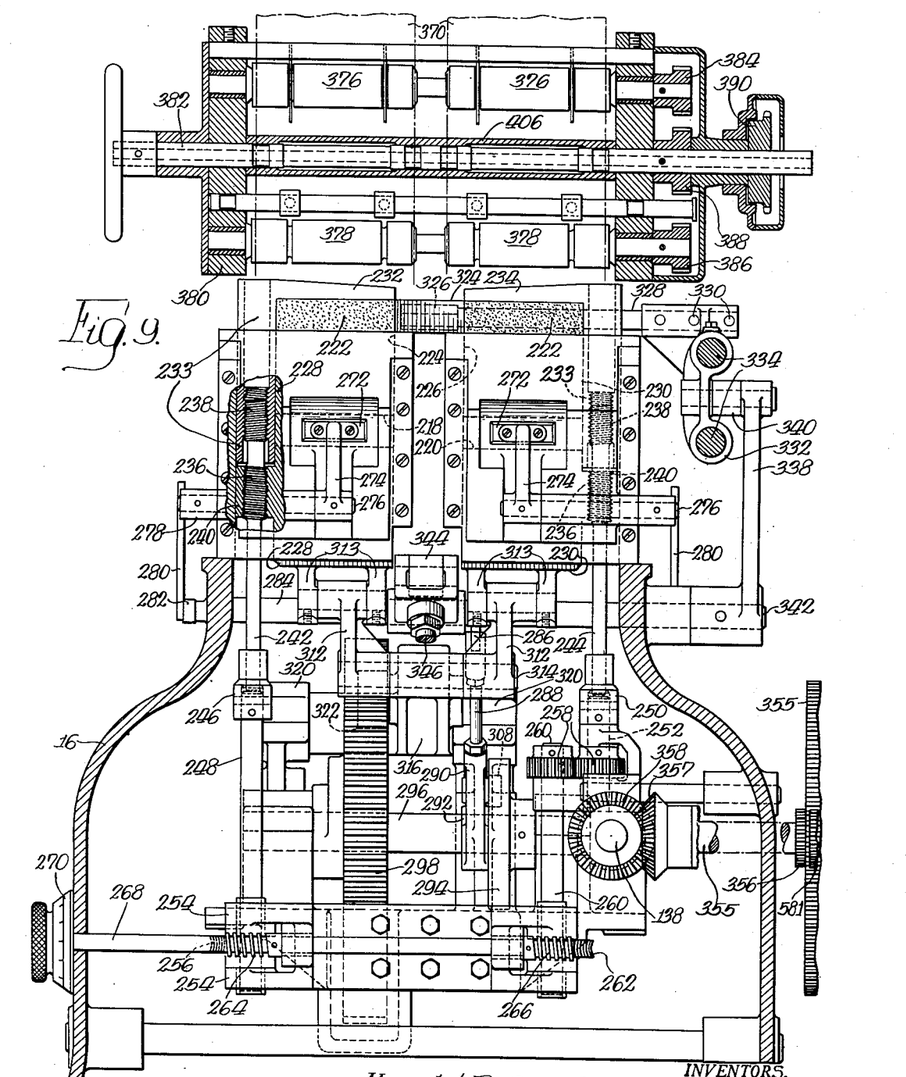
Fig. 9 is an enlarged vertical sectional view on the line 9—9 of Fig. 1 showing a front view of Fig. 7 and looking at Fig. 7 from the right.

A horizontal ram 324 for the butter prints 222 is provided (see Figs. 7 and 8). The ram 324 has a central portion 326, whereas the ram itself is (in plan view) in the form of the arms of a T, the leg of which is the portion 326. Thus the ram will accommodate two prints of butter, one from each of the vertical rams 228 and 230.

The portion 326 of the ram 324 is secured to a laterally extending bar 328 which is anchored as by bolts 330 to a slide 332. The slide 332 is adapted to slide on a pair of stationary guide rods 334 (see Fig. 9) supported by a bracket 336 (see Fig. 8). The slide 332 is reciprocated along the guide rods 334 by a lever 338 connected thereto by a link 340 (see Fig. 8, and by dotted showing in Fig. 11). The lever 338 is secured to a shaft 342 to which an arm 344 is also secured, and the arm 344 has pivoted thereto the upper end of a link 346.

The link 346 terminates in a fork 348 (see Fig. 10) which is slidable on a guide block 349 and carries a roller 350 cooperating with the groove of a cam 352. The cam 352 is mounted on a cam shaft 354 which is driven by a gear 355 through a pinion 356 (see Fig. 9) and a pair of bevel gears 357 and 358. The bevel gear 357 is mounted on a cross shaft and the bevel gear 358 is mounted on the shaft 138 as also shown in Fig. 7.

Figure 10:
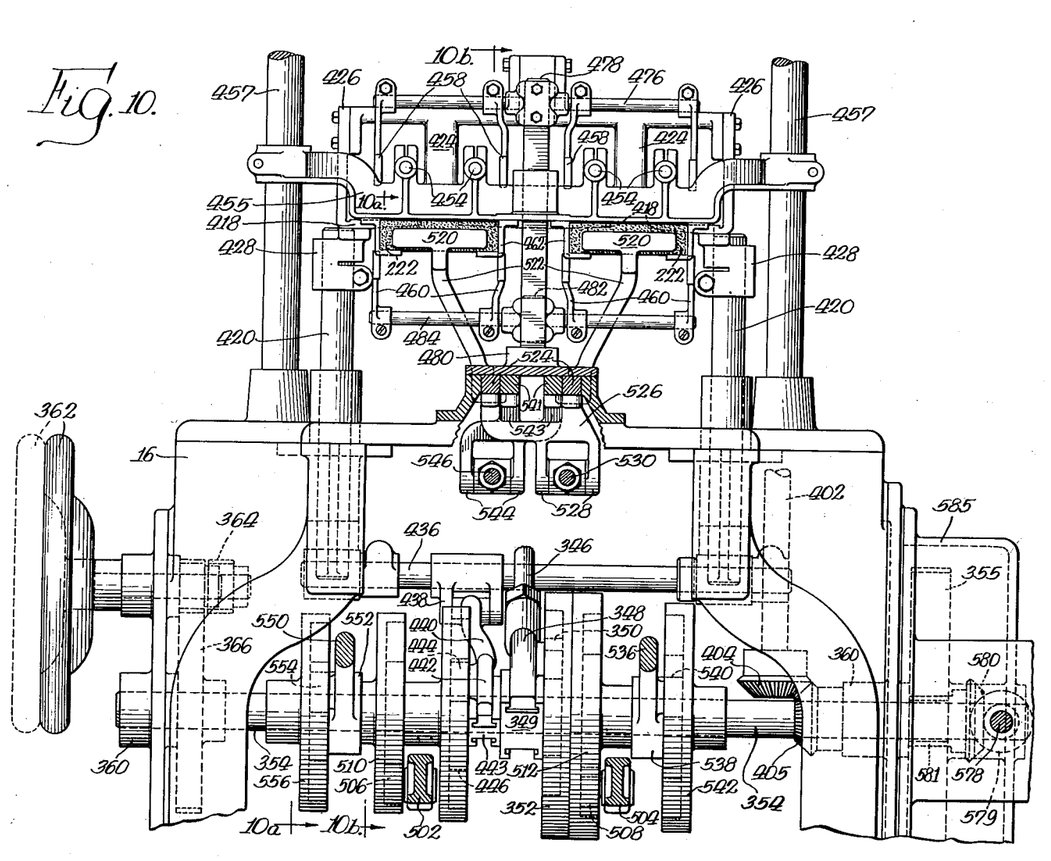
Fig. 10 is an enlarged vertical sectional view on the line 10—10 of Fig. 1 showing a portion of the parchment wrapping mechanism and the cam shaft for operating the same.

The cam shaft 354 is journaled in bearings 360 of the frame 16 and may be rotated manually for observing the operation of the various parts driven by the cam shaft by means of a hand wheel 362 having thereon a pinion 364. As shown in Fig. 10, the pinion 364 is normally out of mesh with a gear 366 secured to the cam shaft 354, but may be pulled into mesh with it, as shown by dotted lines, for rotating the gear and thereby the cam shaft.

Carried by the frame 16 are two pairs of brackets 368 (Fig. 11) which support rolls of parchment 370, one roll for the prints from each of the molds 224 and 226. The parchment passes around suitable rollers 372 and 374 and then down between pairs of rollers 376 and 378 carried in a guide and cutter head assembly 380. As shown in Fig. 9, the rollers 376 and 378 are geared to a shaft 382 by means of gears 384, 386 and 388 (and intermediate gears, not shown). The shaft 382 is driven by a sprocket 390 and a chain 392 (see Fig. 11) from a sprocket 394. The sprocket 394 is secured to a shaft 396 which is driven by bevel gears 398 and 400 from a shaft 402. The shaft 402, as shown in Fig. 10, is driven by a bevel gear 404 in mesh with a bevel gear 405 secured to the shaft 354.

Figure 11:
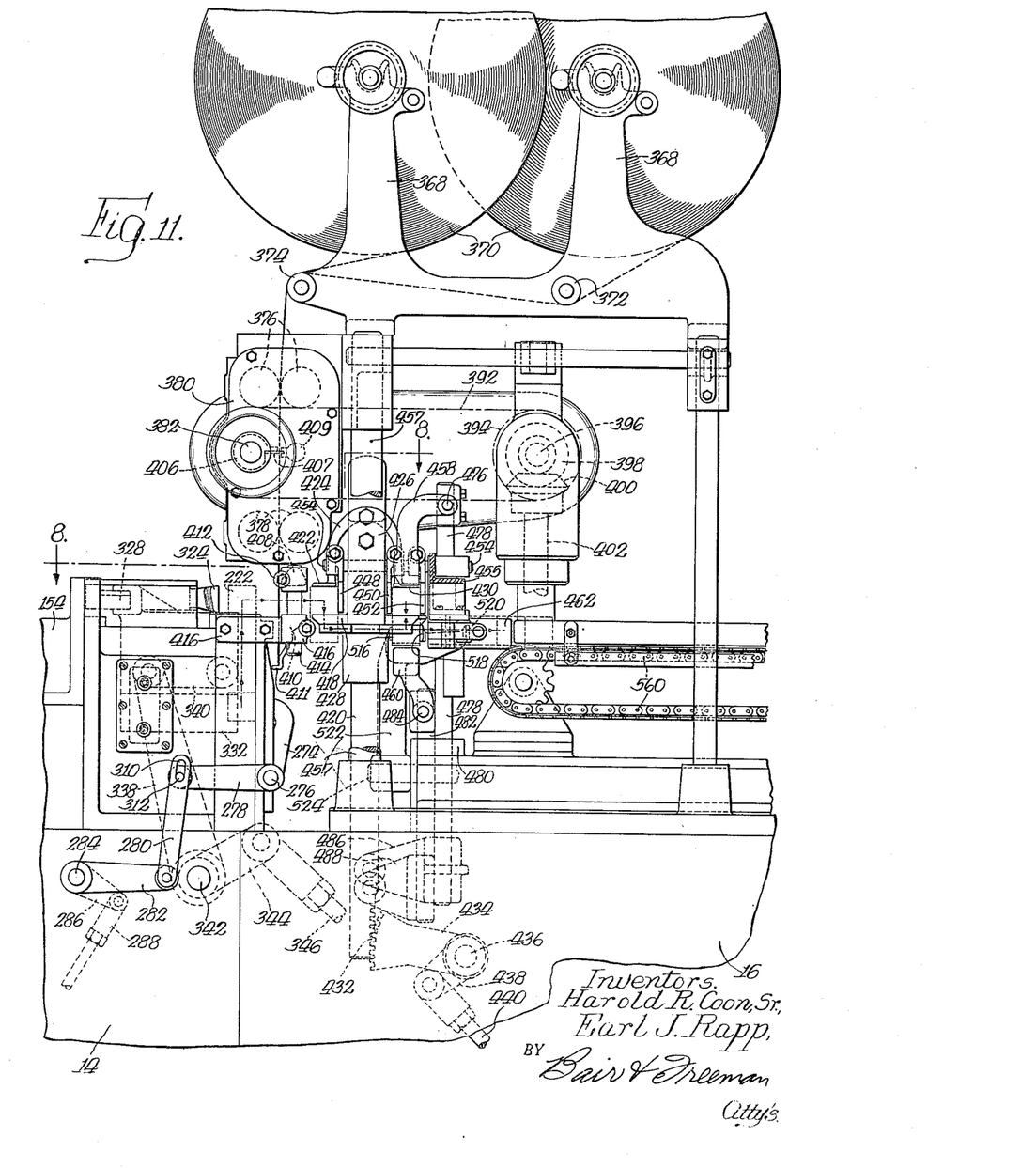
Fig. 11 is a side elevation of the portion of the machine indicated by the bracket 11 adjacent Fig. 1, showing the wrapping mechanism for wrapping the print with parchment and indicating the path of the print through the wrapping mechanism (Fig. 8 being taken on the line 8—8 of Fig. 11)

The cutter head assembly 380 includes a cutter roll 406 on the shaft 382 having a suitable cutter blade 407 thereon for cooperating with a slotted shaft 409 for cutting the parchment 370 into pieces of the proper length for wrapping the prints of butter (see Fig. 11, dotted lines). Since the cutter forms no part of our present invention, however, it will not be described in detail.

The parchment 370, upon leaving the rollers 378, extends downwardly to the position shown in Figs. 7 and 11 in front of stationary parchment folding bars 408 and 410 to a stop finger 411 supported by the bar 410. The bars 408 and 410 are supported by brackets 412 on vertical stationary rods 414 (see Figs. 8 and 11). The rods, in turn, are supported in brackets 416 of the transmission housing extension 14.

Vertically movable platforms 418 having notches 419 are supported by a pair of rods 420 adjacent the bars 408 and 410. These platforms are adapted to receive the prints of butter 222 as they come from between the bars 408 and 410 and to support them in conjunction with top plates 422 supported by yokes 424. The yokes are connected to brackets 426 (see Fig. 10) which, in turn, are connected with hubs 428 clamped to the rods 420. The platforms 418 and the plates 422, as well as a second set of plates 430 (also supported by the yokes 424 in Fig. 11) are vertically movable by arranging the rods 420 so that they can be slid vertically.

To effect such vertical sliding of the rods 420 we provide rack teeth 432 cut in the rods 420 adjacent their lower ends with which the gear sectors 434 are meshed. The gear sectors are mounted on a rock shaft 436 having an arm 438. A link 440 is pivoted to the arm 438 and has a yoke 442 at its lower end straddling a guide block 443 on the cam shaft 354, the arrangement being similar to the yoke 290 and its associated parts in Fig. 7. The yoke 442 carries a roller 444 coacting with a groove of a cam 446 on the shaft 354. The parts just described (418 to 446) enter into the folding operations of the parchment around the print, as will hereinafter appear.

Stop plates 448, 450 and 452 (see Figs. 8, 11 and 17) are supported by being clamped to rods 454 carried by a cross bar 455. The cross bar 455 is stationarily mounted by being clamped at its ends to vertical stationary rods 457.

Figure 10A:
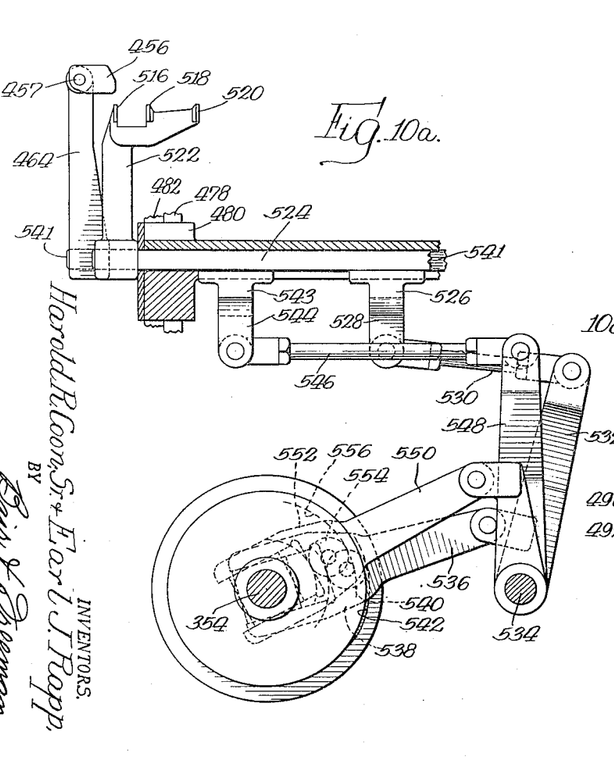
Fig. 10a is a vertical sectional view on the line 10a—10a of Fig. 10 showing a portion of the print wrapping mechanism, the mechanism here shown being for certain of the parchment folding apparatus.
Figures 16, 17, 18, 19, 20, 21:
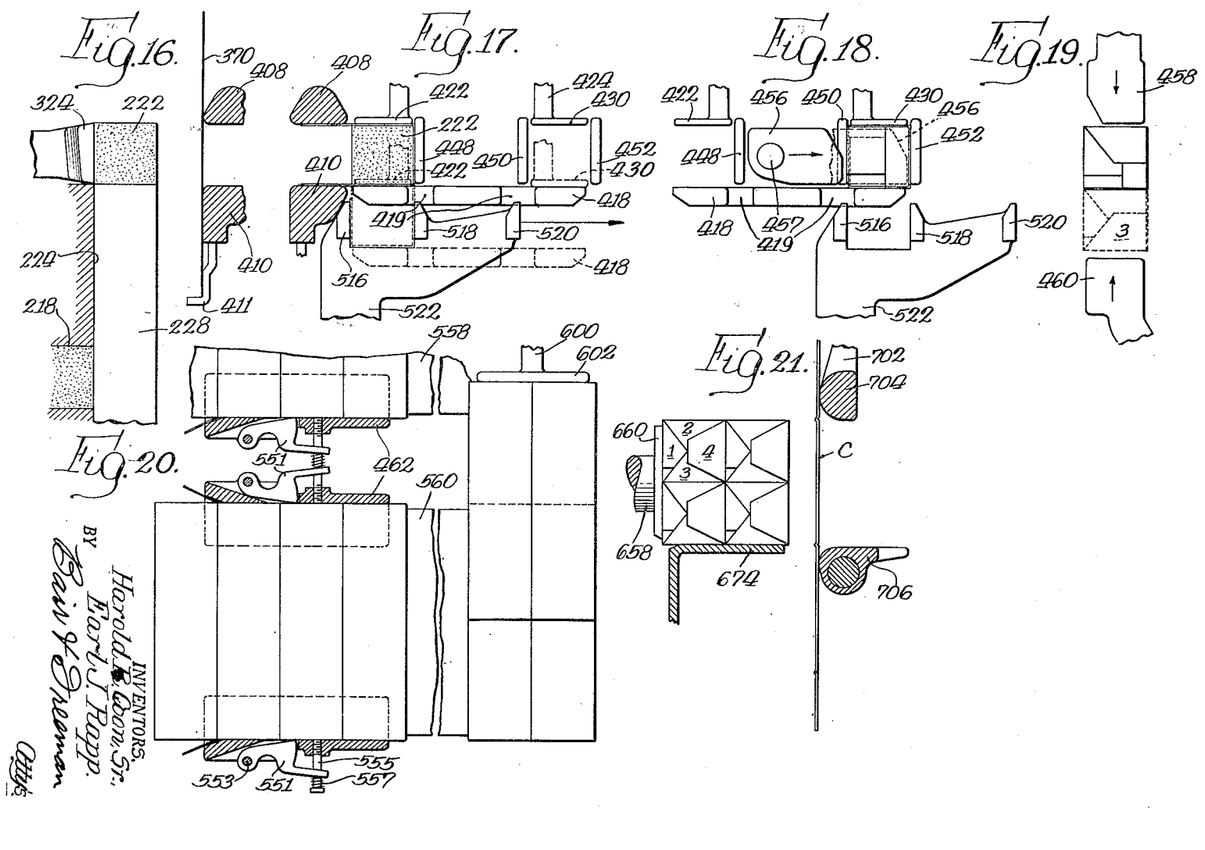
Fig. 16 is a vertical sectional view similar to a portion of Fig. 7 at the right side thereof and showing the position of the butter print with relation to the parchment at the beginning of the parchment wrapping operation.
Figs. 17, 18 and 19 are vertical sectional views a short distance in the machine ahead of Fig. 16 and showing further steps in the parchment wrapping process.
Fig. 20 is a plan view of portions of the intake conveyors which receive the wrapped prints.
Fig. 21 is a vertical sectional view showing four wrapped prints.

End folder plates are provided for the parchment during the wrapping of the print of butter. These, in the order of their operation, are first end fold plates 456 (Figs. 8, 10a, and 18), second end fold plates 458 (Figs. 8, 10, 10b, 11 and 19), third end fold plates 460 (Figs. 10, 10b, 11 and 19), and fourth end fold plates 462 (Figs. 11 and 20). The first end fold plates 456 are clamped to a rod 457. The rod, in turn, is supported by an upright bracket 464 which is secured to the left-hand ends of a pair of horizontal slide bars 541 in Fig. 10a.

Figures 10B, 10C:
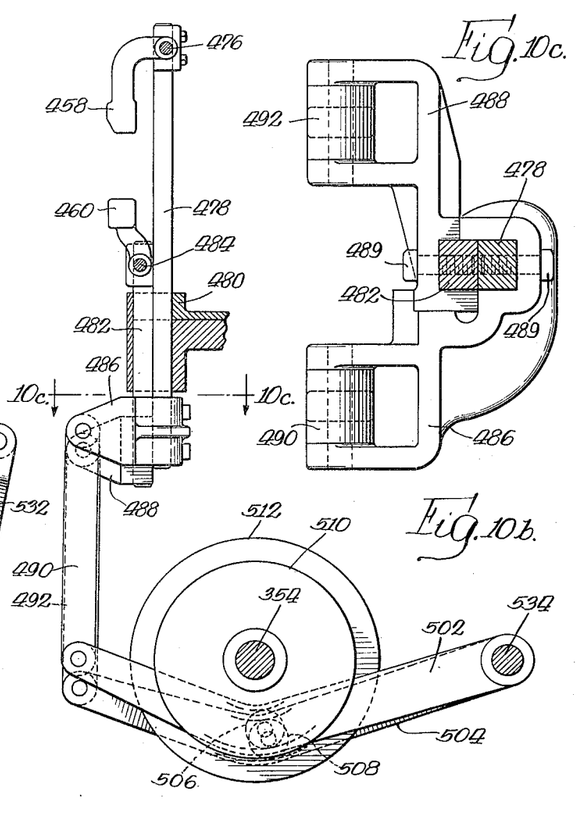
Fig. 10b is a vertical sectional view on the line 10b—10b of Fig. 10, showing another portion of the print wrapping mechanism.
Fig. 10c is an enlarged horizontal sectional view on the line 10c—10c of Fig. 10b.

The second end fold plates 458 are clamped to a shaft 476 supported by a vertically slidable bar 478. The bar 478 slides in a boss 480 of the frame 16, as best shown in Fig. 10b, and also slidable in this boss is a bar 482. The bar 482 supports a shaft 484 which, in turn, supports the third end fold plates 460. For effecting vertical sliding of the bars 478 and 482 we provide brackets 486 and 488 secured thereto by bolts 489. The brackets are pivoted to the upper ends of links 490 and 492. The lower ends of the links are pivoted to levers 502 and 504 carrying rollers 506 and 508. The rollers 506 and 508 cooperate with grooves of cams 510 and 512 on the cam shaft 354 and the levers 502 and 504 are pivoted on a stationary shaft 534.

Print advancing paddles in sets of three are provided for each row of prints issuing from between the parchment folder bars 408 and 410. These are shown at 516, 518 and 520 in Figs. 10a, 11, 21 and 22, and the notches 419 of the platforms 418 are adapted to receive them at various points in the cycles of operation. Each set of three paddles 516, 518 and 520 is supported by an arm 522. The two arms 522, as shown in Fig. 10, are secured to a pair of horizontal slide bars 524 which are slidable longitudinally of the machine. These bars are connected together at their forward ends by a U-shaped bracket 526 having a pair of ears 528 between which a link 530 is pivoted. The link 530 is connected to a bell crank lever 532 (see Fig. 10a) pivoted on a shaft 534 and having a link 536 terminating in a fork 538, straddling the cam shaft 354. The fork 538 carries a roller 540 coacting with the groove of a cam 542 on the shaft 354.

By referring to Fig. 10 it will be noted that the pair of bars 541 are slidable between the bars 524. The bars 541 are connected together intermediate their rear ends by a U-shaped bracket 543 which has a pair of depending ears 544 (see Fig. 10a). A link 546 has one end pivoted to the ears 544 and its other end pivoted to an arm 548 which is also pivoted on the stationary shaft 534. A link 550 is pivoted to the arm 548 and terminates in a fork 552 straddling the cam shaft 354. The fork carries a roller 554 which cooperates with the groove of a cam 556 on the cam shaft 354. The first end fold plates 456 are thus operated by the bars 541, the links 546, the lever 548, the link 550 and the cam 556.

Figures 12, 12A:
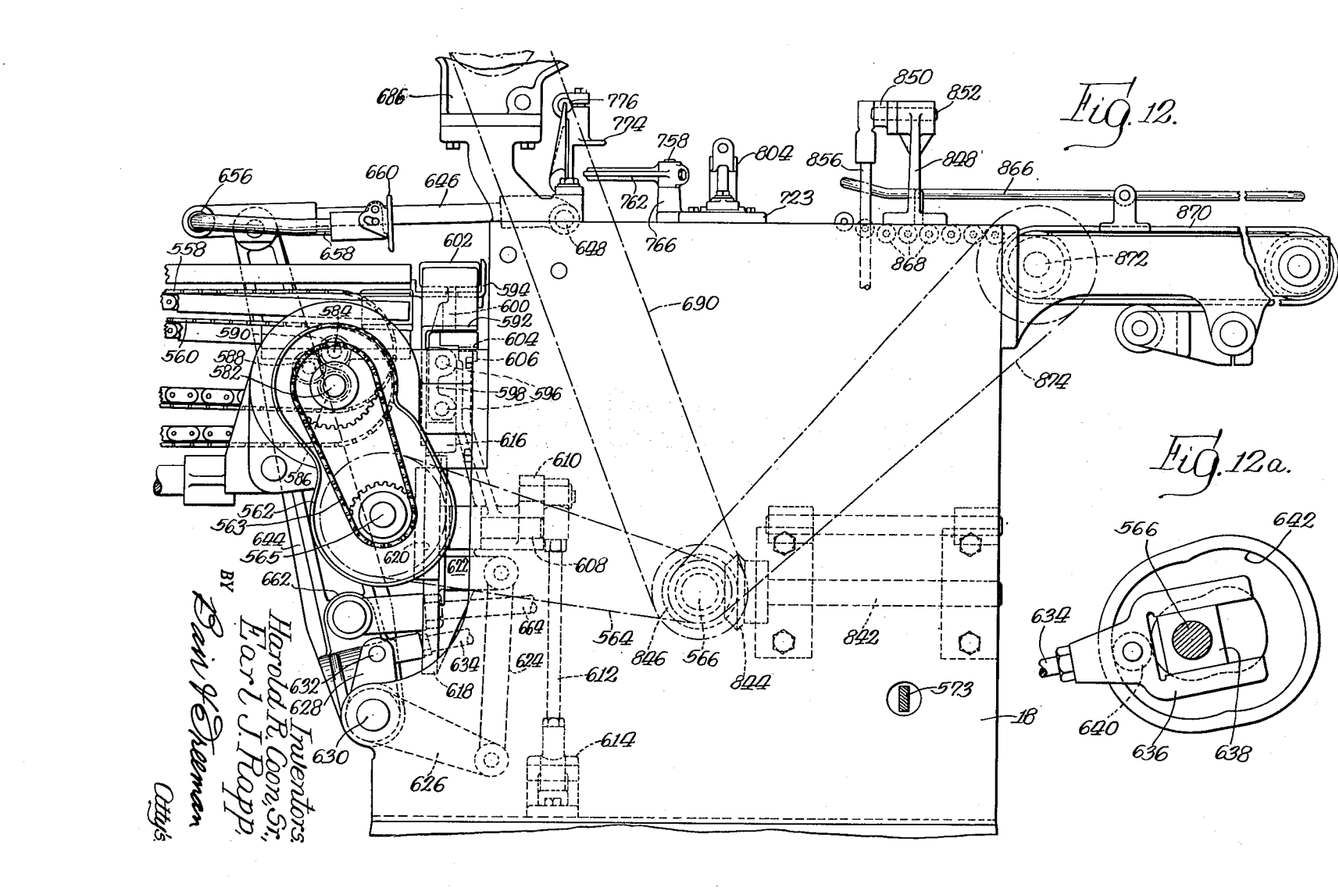
Fig. 12 is a side elevation of the portion of Fig. 1 indicated by the bracket 12 and showing by dot-and-dash lines the drive from a cam shaft to various other elements of the machine.
Fig. 12a is a vertical view showing said cam shaft in section and a cam and associated mechanism for operating a certain link shown in Fig. 12.
Figure 13:
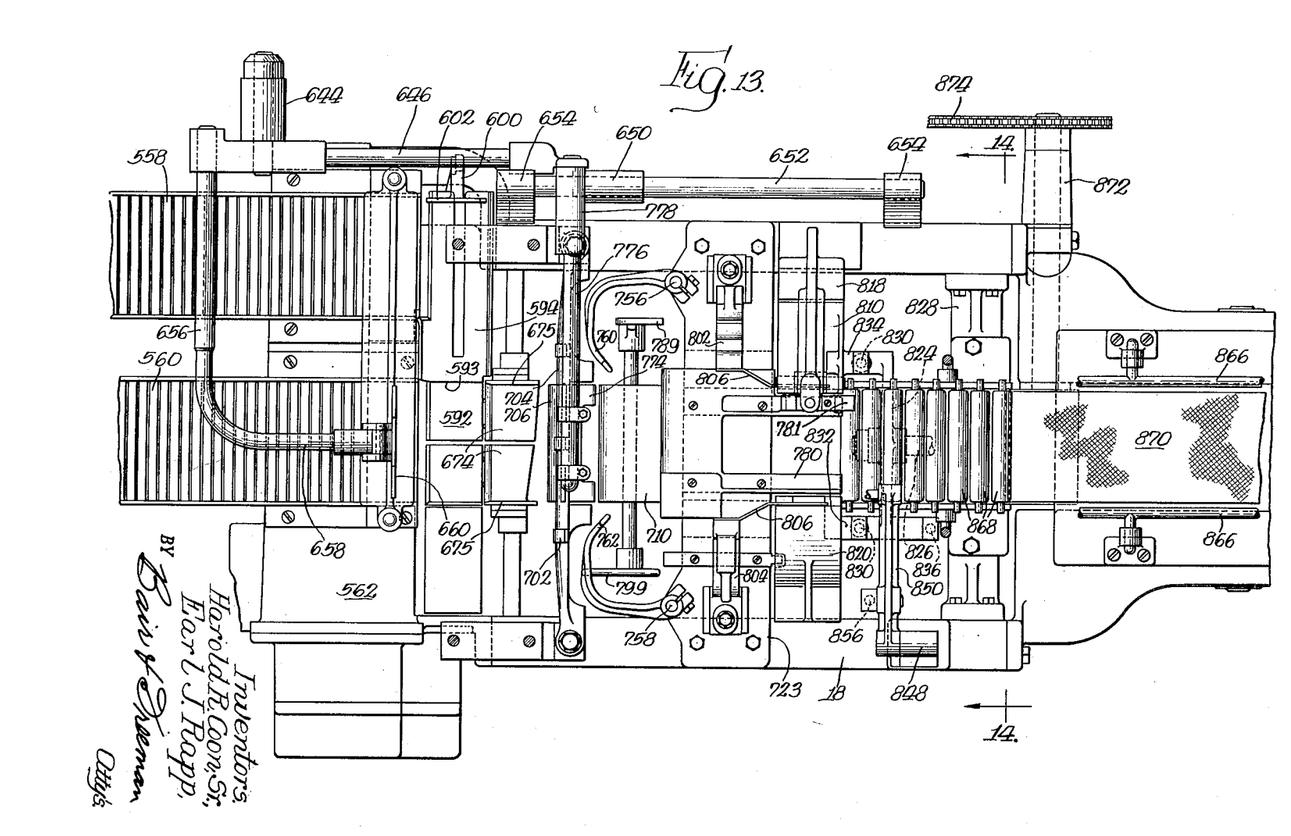
Fig. 13 is a plan view of the portion of the machine shown in Fig. 12.

Conveyors are provided for the prints of butter after they leave the parchment wrapping mechanism just described. These conveyors are shown at 558 and 560 (see Figs. 12 and 13). The driving mechanism for the conveyors 558 and 560 is shown in Fig. 12 and consists of a chain 563 and sprockets within a housing 562 and a chain 564. The chain 564 connects a shaft 565 driven by the chain 563 with a carton folder cam shaft 566 journaled in the frame 18. The shaft 566 is driven through suitable bevel gears 568 and 570, a clutch mechanism 572 and step-down gears 574, 575, 576 and 577 (see Figs. 14 and 15) from a shaft 178. The shaft 578 (see Fig. 10) is connected through suitable bevel gears 579 and 580 with a pinion 581 in mesh with the gears 355 in a housing 585 of the frame 16. The gear 355 is secured to the cam shaft 354.

Figure 14:
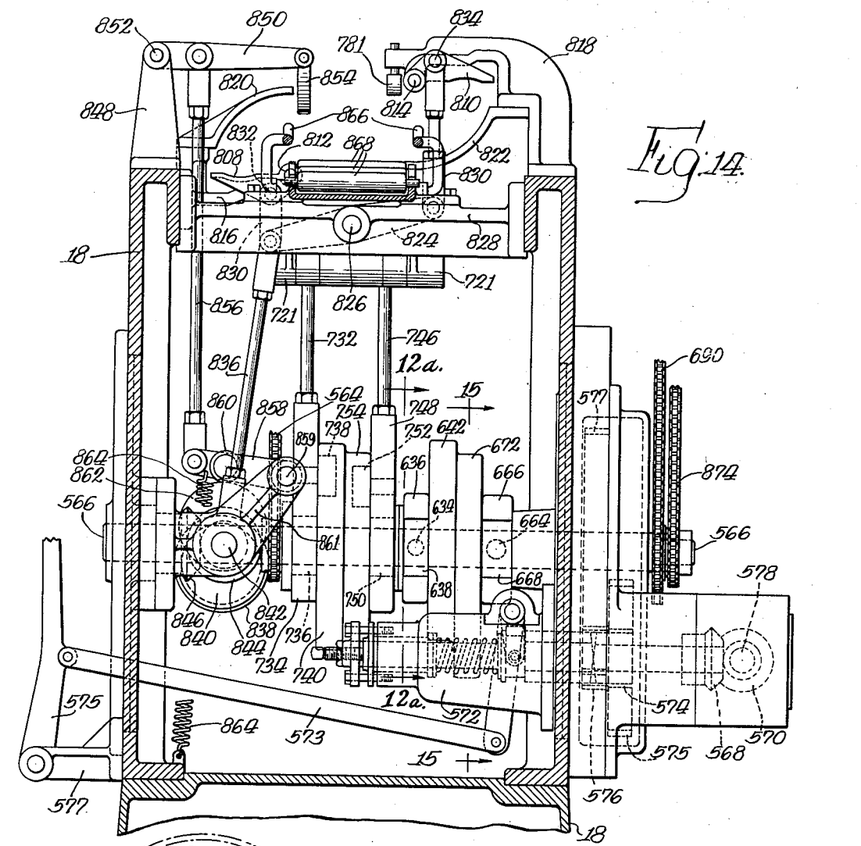
Fig. 14 is a vertical sectional view on the line 14—14 of Fig. 13 showing a cartoning cam shaft and details of the various mechanisms driven thereby.
Figure 15:
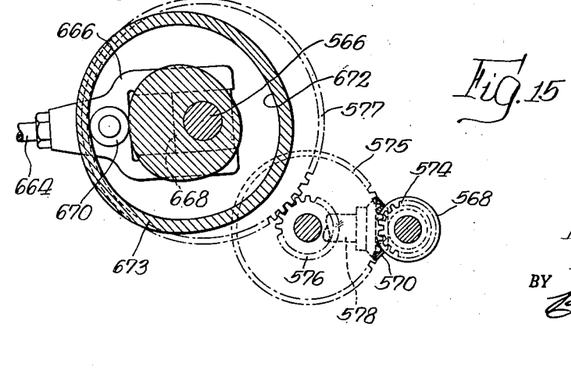
Fig. 15 is a vertical sectional view on the line 15—15 of Fig. 14 (Fig. 12a being taken on the line 12a—12a of Fig. 15)

The clutch mechanism 572 of Fig. 14 is controlled through a link 573 by a manually operable clutch lever 575. The clutch lever is pivoted to a stationary bracket 577 and is located outside of the frame of the machine as shown.

The gearing within the housing 562 drives a shaft 582 around which the conveyor belt 560 extends (see Fig. 12). The conveyor belt 558 extends around a shaft 584 which is somewhat higher than the shaft 582. The shaft 584 is geared to the shaft 582 by intermediate gears 586, 588 and 590.

All of the operating elements of the machine are driven by the motor 20 through the various shafts and gears, as already explained. The various cams are so contoured and timed in relation to each other that the various parts of the machine cooperate to form and wrap the butter prints.

*Practical operation*

In the operation of our wrapping machine the rolls of parchment 370 are provided as in Fig. 1, and the butter or other product to be formed into prints is placed in the hopper 154. The butter may be deposited in the chute 176 or placed in the hopper in any convenient manner With the motor 20 energized the machine is ready to operate and operation is started under control of the lever 59 which engages the clutch represented by the parts 32 to 54 in Fig. 2. This results in rotating the shafts 138 and 139 and the clutch members 94 and 100.

When the lobe of the cam 128 engages the roller 126 the bell crank 124 will be rocked clockwise for engaging the serrated face 96 of the clutch member 94 with the serrations 92 of the gear 80. If the apices of the serrations engage first, the spring 109 will be compressed, thus permitting movement of the bolt 107 as caused positively by the cam until such time as the serrations engage properly and cause rotation of the butter printer worms 156 and 158.

The size of the lobe of the cam 128 is such as to rotate the printer worms the necessary amount for forcing two quarter pounds of butter into the nozzles 214 and 216. The eccentric 120 may be adjusted by rotation to change the pivot for the bell crank 124 and consequently its relation to the cam and to the yoke 118 so that the yoke will be held to the left from the position shown in Fig. 2 far enough that the clutch serrations 92 and 96 will not be engaged when it is desirable to operate the machine without operating the worms, as when cleaning or testing the machine. The clutch connection is also designed for absorbing shock by means of the rubber inserts 110 shown in Fig. 3.

While the butter printer worms 156 and 158 are in operation the feeder drum 178 of Fig. 7 is also operating. The blades 184 extend into the hopper 154 for feeding the butter downwardly toward the worms 156 and 158 and these blades are retracted as they pass around the right half of the circle, thus withdrawing them from the butter and projecting them again when they are in position to engage the butter and force it downwardly toward the worms.

The butter which is forced from the nozzles 214 and 216 passes through the outlets 218 and 220 and into the vertical passageways 224 and 226 (224 being shown in Fig. 7). At this time the ram 228 is at its lower limit of movement in the passageway 224 and the butter is thus forced between the upper end of the ram 228 and the lower face of the ram top member 232, which are shown dotted in Fig. 7. While the butter is being forced into the cavity thus formed the valve 272 is open (moved to the left from the position shown in Fig. 7) as determined by the mechanical linkage which rocks the shaft 276. This is described in detail in the Heft, Rapp and Dority patent hereinbefore referred to, and forms no part of our present invention. Its operation will be referred to briefly, however.

The valve 272 in its open position permits air to be exhausted ahead of the butter so that the butter can completely fill the square opening having the dotted surfaces 228 and 232 as its lower and upper limits. Before the ram 228 starts to rise the valve 272 will be positively closed by its operating linkage, whereas if the butter strikes the valve 272 before it is thus positively closed the slotted connection at 310—312 will permit of closure of the valve under the pressure of the butter itself.

The ram 228 is then elevated for cutting off the quarter pound of butter and elevating it to the position shown at 222 in Fig. 7, where it can be engaged by the ram 324. While we have described the operation of the ram 228 only it is obvious that the ram 230 operates in the same manner and in unison with the ram 228 so that there are two prints of butter in position for being engaged by the horizontal ram 324.

With a sheet of parchment 370 in the position shown in Figs. 7 and 16 behind the stationary bars 408 and 410, the ram 324 is advanced for pushing the print of butter against the parchment and then between the bars for folding the top and bottom of the parchment wrapper over the butter, as shown in Fig. 17. The print of butter in this position engages the stop plate 448 and is resting on the platforms 418.

The platforms then move downwardly, causing the lower rear flap of the parchment to be folded upwardly by the paddle 516 as shown by dotted lines, following which the set of paddles 516, 518 and 520 moves toward the right as to the position in Fig. 18. When reaching that position the platforms 418 elevate from the dotted position of Fig. 17 to the position of Fig. 18, thus causing the stop plate 450 to fold the upper rear flap of the parchment, leaving only the end flaps unfolded.

As the platforms 418 move downwardly and upwardly the top plate 422 and 430 move in synchronism with them due to the interconnection between them (the brackets 426, see Fig. 10). Thus the prints of butter are confined against accidentally being lifted out of position against the force of gravity which normally tends to keep them seated on the platforms 418.

The end flaps are now folded in the following described order: The rear end flaps are folded by a forward motion of the first end fold plates 456. The second end fold plates 458 then descend from the position shown in Fig. 19, following which the platform 418 lowers again to the dotted position of Fig. 19 and the third end fold plates 460 rise from the position shown to make the third fold as shown by dotted lines and numbered 3 in this figure. The fourth end fold plates 462 then effect the folding of the last end flaps by forward motion of the print of butter in the machine and onto the conveyor 558 or 560, as the case may be, these plates being stationary and including the movable elements 551 exerting slight spring pressure against the fourth flaps. Such forward motion of the print is effected by the paddle 520 as the three paddles 516, 518 and 520 move forwardly for advancing the next print of butter from the dotted position of Fig. 17 to a position below the space between the stop plates 450 and 452 so that the second print can be lifted to the Fig. 18 position.

At the upper left-hand corner of Fig. 21 the order of folding of the parchment end flaps has been indicated by the numerals 1, 2, 3 and 4. The print wrapping mechanism just referred to is somewhat similar to that shown in the Heft and Rapp patent, No. 2,253,211, issued August 19, 1941, over which the present invention is an improvement.

The prints of butter are carried forwardly in the machine by the conveyors 558 and 560 to a cartoning device or the like.

Our machine is designed for efficient wrapping of quarter pound prints of butter. In its construction and operating characteristics it represents an improvement over the various patents herein mentioned.

Some changes may be made in the construction and arrangement of the parts of our machine without departing from the real spirit and purpose of our invention, and it is our intention to cover by our claim such modified forms of structure or use of mechanical equivalents as may be reasonably included within their scope.

We claim as our invention:

In a machine of the character disclosed, spaced stationary bars, a ram for moving a print of butter or the like against a sheet of parchment and then moving the print and the parchment between said bars for folding the parchment across the top and bottom of the print, said bars extending rearwardly in the planes of the folded sheet as far as the trailing edges of the folded sheet, a plurality of paddles, a stop plate, means for lowering the print for folding one of the trailing edges of the parchment by its engagement with an edge of the lower of said bars, means for elevating the print for folding another trailing edge of the parchment by engagement with said stop plate, end flap folders for folding the end of the parchment, and means for moving said paddles for thereby advancing the print of butter in the machine.

HAROLD R. COON, Sr.
EARL J. RAPP.

REFERENCES CITED

The following references are of record in the file of this patent:

UNITED STATES PATENTS

| Number | Name | Date |
|---|---|---|
| 1,254,895 | Ferguson | Jan. 29, 1918 |
| 1,481,207 | Johnson | Jan. 15, 1924 |
| 1,589,229 | Roberts | June 15, 1926 |
| 1,624,203 | Aldrich et al. | Apr. 12, 1927 |
| 1,803,633 | McCain | May 5, 1931 |
| 1,851,457 | Smith et al. | Mar. 29, 1932 |
| 1,881,844 | Morris | Oct. 11, 1932 |
| 1,889,846 | Wright | Dec. 6, 1932 |
| 1,955,331 | Howard et al. | Apr. 17, 1934 |
| 1,971,574 | Moon | Aug. 28, 1934 |
| 2,019,002 | Drohmann et al. | Oct. 29, 1935 |
| 2,111,901 | Ness | Mar. 22, 1938 |
| 2,157,949 | Benz | May 9, 1939 |
| 2,211,638 | Benz | Aug. 13, 1940 |
| 2,253,211 | Rapp et al. | Aug. 19, 1941 |
| 2,276,744 | Smith | Mar. 17, 1942 |
| 2,379,655 | Russell et al. | July 3, 1945 |